UNITED STATES PATENT OFFICE.

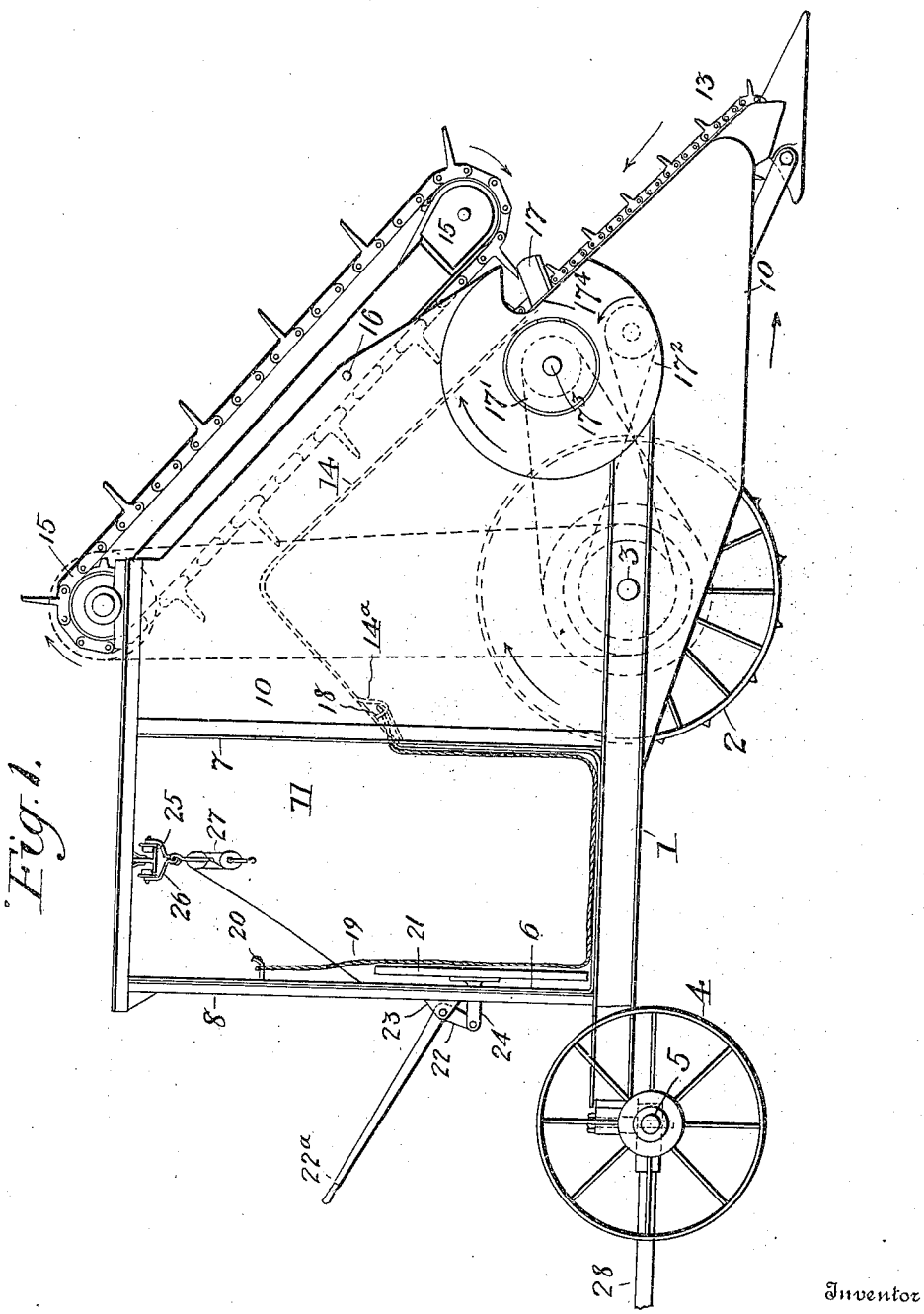

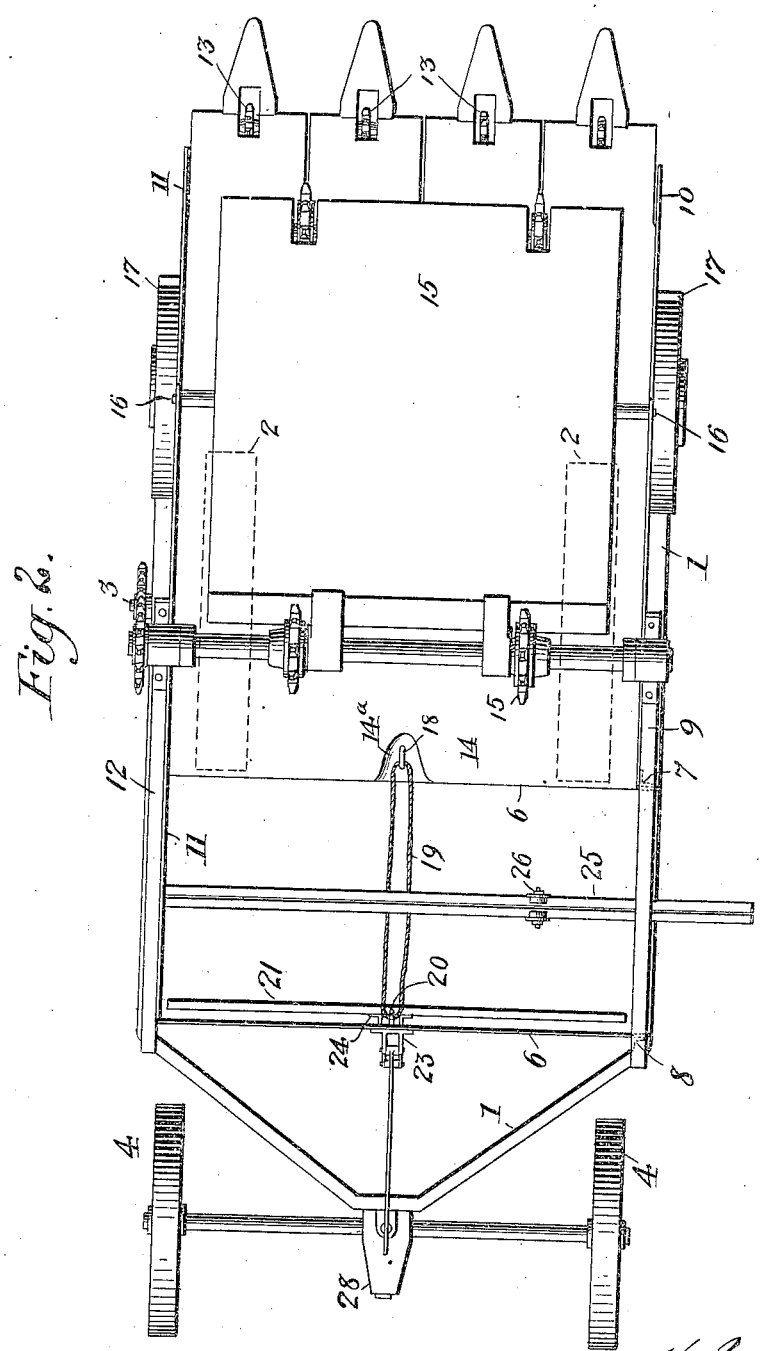

HENRY GABRIEL GINACA, OF HONOLULU, TERRITORY OF HAWAII, ASSIGNOR, BY DIRECT AND MESNE ASSIGNMENTS, OF TWO-FIFTHS TO ABRAHAM GARTENBERG, OF HONOLULU, TERRITORY OF HAWAII.

SUGAR-CANE BUNDLER.

953,329. Specification of Letters Patent. Patented Mar. 29, 1910.

Application filed September 22, 1906, Serial No. 335,785. Renewed October 20, 1909. Serial No. 523,702.

*To all whom it may concern:*

Be it known that I, HENRY GABRIEL GINACA, a citizen of the United States, residing at Honolulu, county of Oahu, Territory of Hawaii, have invented a new and useful Sugar-Cane Bundler, of which the following is a specification.

This invention relates to machines for gathering sugar cane previously cut and lying in the field and making it into bundles suitable to be loaded by any of the loading machines using hauling or lifting cables such as are now in use on sugar cane plantations. For in loading sugar cane cut in the field onto cars by any of such loading machines, it is necessary that the cane be first bundled, and this has heretofore been accomplished by hand labor and is the greatest item of expense in machine loading.

The object of this invention is to produce a machine which will accomplish the gathering and bundling of the cane in an economical and efficient manner, and thereby reduce the number of laborers hitherto employed for this purpose. This object is attained by the machine hereinafter described, which comprises a body mounted on wheels, supporting a receptacle for receiving cane and for assembling the bundle, devices for picking-up and elevating the cane from the ground into said receptacle, means for cutting cane projecting over the sides of the machine, means for compressing the bundle and for removing the bundle from the receptacle after it has been tied, means for propelling and steering the machine, and means for operating the said devices and mechanisms.

The construction and functions of the picking-up and elevating devices and the side-cutting mechanisms are substantially as described and claimed in my application for United States patent filed January 15, 1906, Serial No. 296,188, as applied to a sugar cane harvester, and consequently will be but briefly referred to hereinafter.

This specification is a specific description of one form of the invention, while the claims are definitions of the actual scope thereof.

Reference is to be had to the accompanying drawings forming a part of this specification, in which similar characters of reference indicate corresponding parts in the views.

Figure 1 is a side elevation. Fig. 2 is a top plan view.

The body 1 of the machine is supported by the harvester wheels 2 on an axle 3 inside the forward portion of said body, and by the steering wheels 4 on the axle 5 in the rear of the machine, all mounted in a well known manner. The width of the body 1 is preferably about the length of a bundle of cane. The gage of the wheels 2 and 4 is made less than the width of said body. A receptacle 6, for receiving and assembling the cane for a bundle, made of plate bent as shown, is supported by the body 1 transversely of the center-line of the machine and rearward of the front wheels 2. The vertical edges of one end of the receptacle 6 are attached to the angle-iron posts 7 and 8 respectively secured at their lower ends to one side of the body 1. The upper ends of the posts 7 and 8 are connected by the horizontal angle-iron 9, which projects forward of the post 7.

A vertical side-plate 10 is attached to the forward portion of the body 1 and projects below and forward of said body (Fig. 1). The top edge of the side-plate 10 is fastened to the angle-iron 9, and its rear edge is fastened to the post 7. A similarly shaped but longer side-plate 11 is secured to the opposite side of the body 1, and its rear end closes the end of the receptacle 6, the end of said receptacle being secured to said side-plate 11. An angle-iron 12, similar to the angle-iron 9, is fastened to the top edge of the side-plate 11.

Hinged to the front of the body 1 are the picking-up devices 13, four being shown in Fig. 2. An inclined apron 14, substantially the width of the machine between the side-plates 10 and 11, and above the wheels 2, slopes upward and rearward and then downward, its front edge overlaps the upper portion of the picking-up devices 13, and its rear edge is attached to the forward upper edge of the receptacle 6, shown dotted in Fig. 1. The portions of the side-plates 10 and 11 above said apron 14 form guides for the cane passing over said apron.

The elevating device 15 is supported by the angle-irons 9 12, and by the side-plates 10 11 by the bolt 16 passing through same.

A side-cutting mechanism 17 is provided on opposite sides of the machine, outside of and supported by each of the side-plates 10 and 11. Each of said side cutting mechanisms comprises a knife 17 clamped between duplicate disks $17^1$ (only one of which is shown) on shaft $17^3$. A casing $17^2$ surrounds the disk and knife and is provided with a crotch or recess $17^4$ in its forward edge, through which the knife 17 is projected during its revolution to engage and cut the cane extending over the sides of the machine, so that the portions of the cane lying on the picking-up device may be moved by the latter into position to be engaged by the elevator.

The elevating devices 15 and side-cutting mechanisms 17 are driven by sprockets and link-belts directly from the axle 3 of the front wheels 2, in the directions indicated by arrows in Fig. 1. The elevating chains of the picking-up devices 13 are driven in the opposite direction from the same axle by a twist belt and pulleys as shown, or by sprockets and link-belt and an intermediate gear to change the direction as will be readily understood.

A pocket $14^a$ with a hook 18 is provided in the center of the rear portion of the apron 14, to receive one end of a wire or other rope or sling 19 previous to the admission of cane into the receptacle 6, the other end of the rope or sling 19 being attached to the hook 20 at the center and near the upper rear portion of said receptacle. A board 21 is provided inside of and substantially the length of the receptacle 6, for compressing the cane when assembled in said receptacle. The board 21 is moved forward or backward by means of the crank-lever 22, with handle $22^a$, pivoted to a bracket 23 attached outside of the rear of the receptacle 6, said lever 22 being connected by a strap 24 passing through a slot in the rear of the receptacle 6 and secured to the board 21. A track 25 is supported by the angle-irons 9 12 over the longitudinal center of the receptacle 6 and projects somewhat beyond the open end of said receptacle over the side of the machine as shown in Fig. 2. On the track 25 is provided a trolley 26 to which is attached a block and fall 27.

The machine is propelled through the field by mules or horses attached to the pole 28 connected to the axle 5 of the steering wheels 4 in the rear of the machine.

In operation, as the machine is moved forward through the field, the picking-up devices 13 raise the cut cane from the surface of the ground and elevate same to where the elevating device 15 engages it and drags it up the apron 14, between the side-plates 10 and 11, until it slides down the rear portion of said apron into the receptacle 6. Portions of cane which project over the sides of the machine when being thus elevated are cut off by the side-cutters 17. When the receptacle 6 has been filled with sufficient cane for a bundle, the machine is stopped, the handle $22^a$ is depressed forcing the board 21 forward, compressing the cane into a compact bundle. The ends of the rope or sling 19 are then unhooked from the hooks 18 and 20 and are connected, tying the bundle. The block and fall 27 is then attached to the sling or rope 19, and the bundle is thereby raised and transported, the trolley 26 moving on the track 25, to the side of the machine, where the bundle is lowered onto the ground ready to be loaded onto cars by any of the loading machines hereinbefore mentioned. The machine is then moved forward and these operations as described are repeated.

It will be noted that the picking-up devices 13 are practically the full width of the machine, so that the cut cane is picked up from the field the full width of the machine as the machine moves forward; and as the gage of the wheels 2 and the gage of the wheels 4 are both less than the width of the machine these wheels do not pass over and crush cane on the ground.

Having thus described my invention, I claim as new and desire to secure by Letters Patent—

1. A cane bundler, comprising a body supported by wheels provided with a receptacle for assembling the bundle, picking-up and elevating devices for raising the cut cane from the ground into said receptacle, and means for cutting off portions of cane which project over the sides of the machine while being elevated.

2. A cane bundler, comprising a body supported by wheels and provided with a receptacle the full width of the machine, picking-up and elevating devices, side-cutting mechanisms, and an apron over which the cane passes into said receptacle.

3. A cane bundler, comprising a body supported by wheels and provided with a receptacle for assembling the bundle, picking-up and elevating devices, side-cutting mechanisms, and means for compressing cane in said receptacle.

4. A cane bundler, comprising a body supported by wheels and provided with a receptacle, said receptacle longer than the gage of said wheels, picking-up and elevating devices, an apron over which the cane passes into said receptacle, side-cutting mechanisms, means for forming and for removing the bundle, and means for propelling said devices and mechanisms when the machine moves forward.

5. A cane bundler, comprising a body supported by wheels and provided with a receptacle the full width of the machine, picking-up and elevating devices, side-cutting mechanisms, side-guides, and an apron between said side guides over which the cane passes into said receptacle.

6. In a bundler of the kind described, a receptacle for receiving the cut cane and assembling the same in a bundle, picking-up and elevating mechanisms for raising the cut cane from the ground into said receptacle, side cutting mechanism, means for holding a rope or sling in the receptacle in which the cane is assembled and the bundle formed.

7. In a bundler of the kind described, a receptacle for receiving the cut cane and assembling the same in a bundle, picking-up and elevating mechanisms for raising the cut cane from the ground into said receptacle, side cutting mechanism, means for holding a rope or sling in the receptacle in which the cane is assembled to form a bundle, and means for compressing the cane in said receptacle previous to its being tied by said rope or sling.

8. In a bundler of the kind described, a receptacle in which the cane for a bundle is assembled, picking-up and elevating mechanisms for raising the cut cane from the ground into said receptacles, side cutting mechanism, means for holding a rope or sling in said receptacle while the cane is being assembled in same, means for compressing the cane previous to tying by said rope or sling, and means for removing the bundle from said receptacle.

HENRY GABRIEL GINACA.

Witnesses:
 Geo. P. Thielen,
 A. Gartenberg.